July 1, 1930.

M. G. O'NEIL 1,768,923

APPARATUS FOR THE COMPRESSION AND STORAGE
OF AIR AND FOR CREATING VACUUMS

Filed Oct. 19, 1929      2 Sheets-Sheet 1

INVENTOR
M. Griffin O'Neil,
BY
John M. Spellman
ATTORNEY.

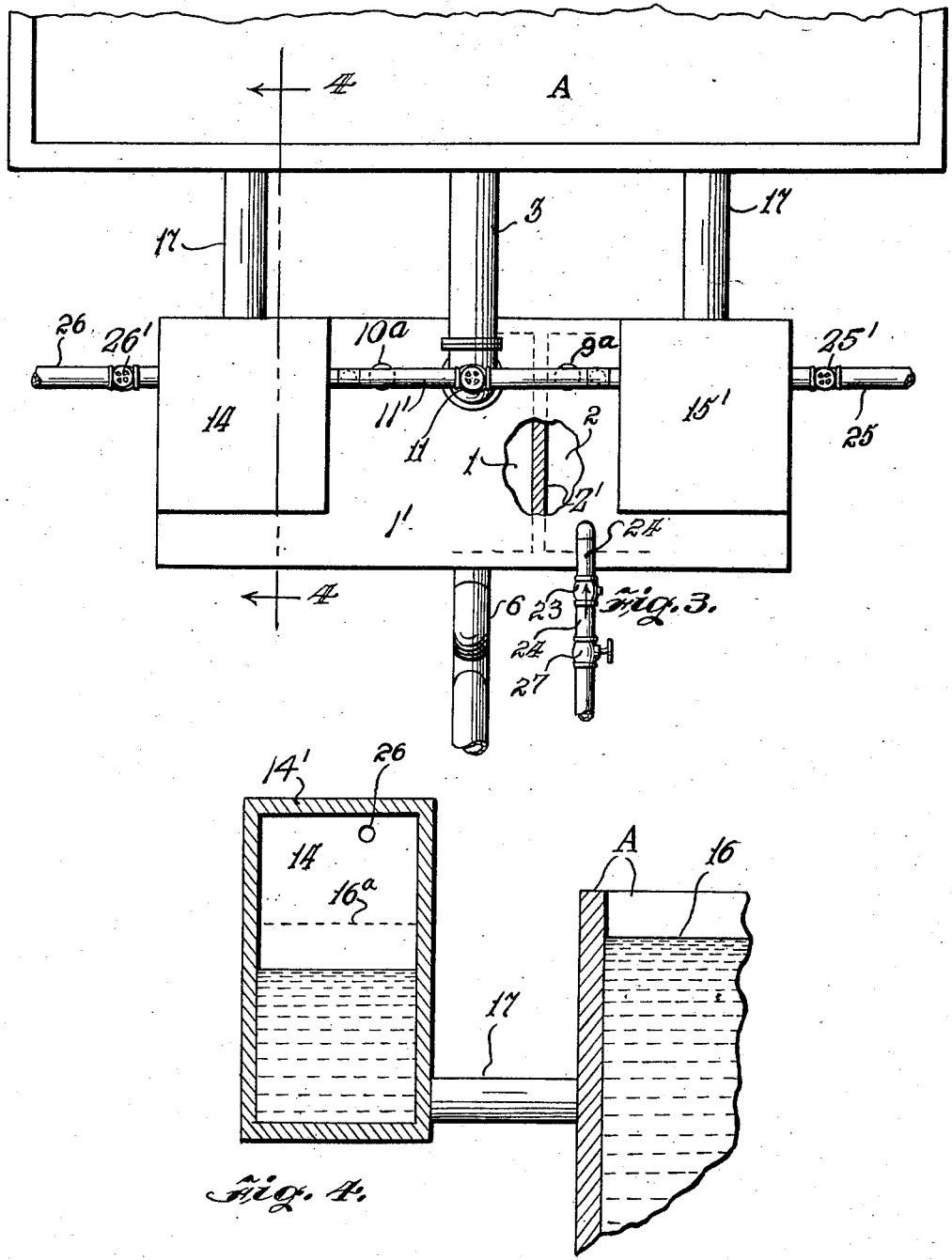

Patented July 1, 1930

1,768,923

UNITED STATES PATENT OFFICE

MATTHEW GRIFFIN O'NEIL, OF DALLAS, TEXAS

APPARATUS FOR THE COMPRESSION AND STORAGE OF AIR AND FOR CREATING VACUUMS

Application filed October 19, 1929. Serial No. 400,815.

The primary object of this invention is the provision of an apparatus for the compression and storage of air and for creating a vacuum whereby the vacuum may operate as a pump.

More particularly defined the invention aims to provide an apparatus of the class indicated which is automatic in its functioning and requiring mainly for its operation a continuous flow of water.

Moreover, the apparatus is simple in construction and is capable of use wherever compressed air is required or a vacuum desired, particularly in canning plants, chemical works, packing plants, water filters and sewage treatment plants.

Another advantageous feature of the invention is its compactness and whereby there is grouped and combined in one unitary construction an air compressor and vacuum pump, together with an air receiver and a gas receiver. There are also included in connection with the air compressor and vacuum pump specially designed water-balanced chambers, so arranged that one may receive and store compressed air, while the other can be used to store gas recovered by the vacuum pump, or whereby both chambers can be utilized in tandem for an air compressor or for the movement of gas.

The invention may be clearly understood from a perusal of the following detailed description, taken in connection with the accompanying drawings and wherein:

Figure 3 represents a top plan view of the apparatus, only a part of the sedimentation tank being shown; and Figure 4 is a view similar to the view in Figure 2, and showing a part of the tank and the air container, the view being taken on the line 4—4 of Figure 3.

Figure 1:
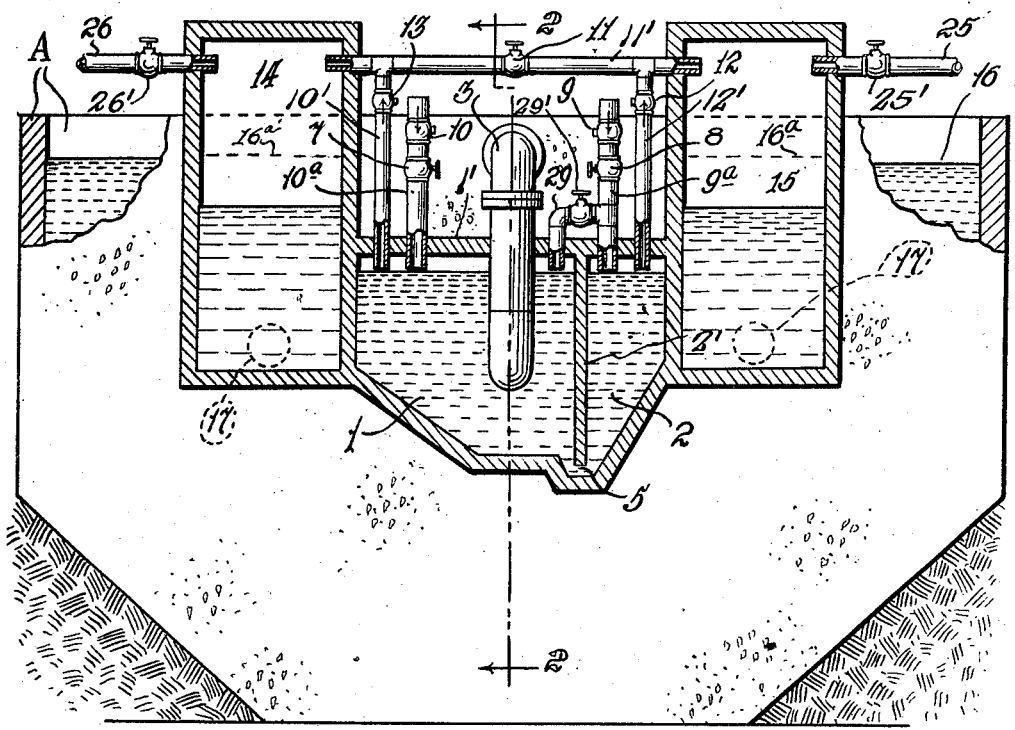
Figure 1 is a longitudinal sectional view through one end of the apparatus comprising the air compression chamber and the vacuum chamber, gas and air containers, and showing their association and connection with a sedimentation tank, the latter being partly broken away.
Figure 2:
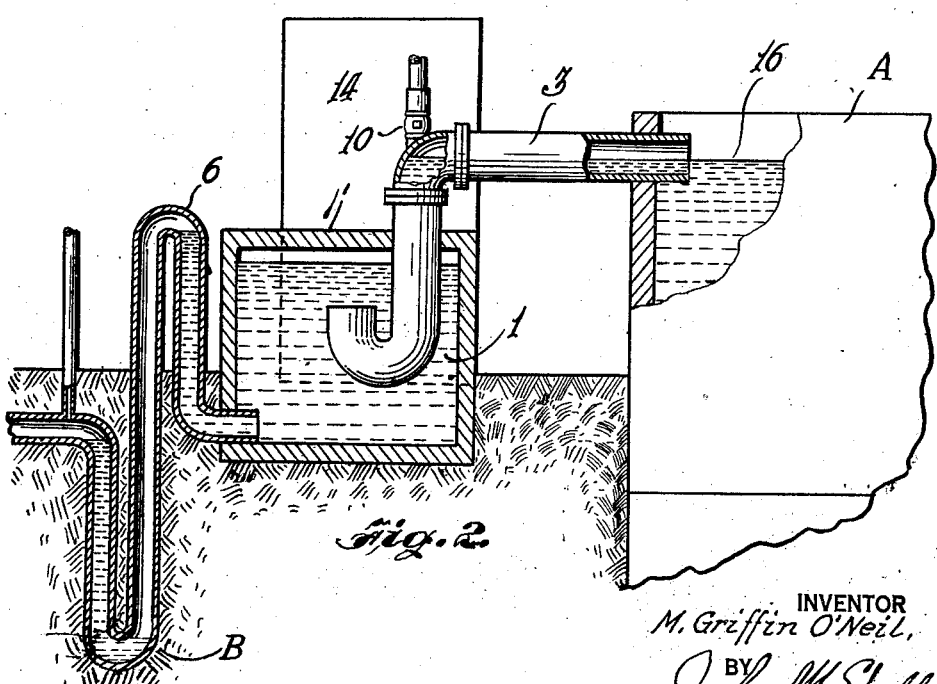
Figure 2 represents a transverse sectional view, taken on the line 2—2 of Figure 1.

Proceeding in accordance with the drawings, the apparatus in its preferred construction comprises a central chamber which has a covering 1' and a partition 2' whereby the chamber is separated into two compartments, an air compressor compartment 1, which is the larger portion of the division, and a compartment 2 (which operates as a vacuum pump, as explained hereinafter) there being a space 5 between the bottom of the partition and the floor of the chamber to permit water to enter the compartment 2.

There are also provided an air receiving chamber 15 and an air receiving chamber 14, having covers 15' and 14'. A sedimentation tank is shown at A, but of course the invention is not restricted to this particular form of tank. The tank has connection with the air compression compartment 1 through the pipe 3 and each of the chambers 14 and 15 are also connected to the tank A by means of the pipes 17. Communication is also established between the chambers 14 and 15 by means of a pipe 11' with a valve 11 which valve is closed during certain operations of the apparatus. Communication is had between the compartments 14 and 15 and the compartments 1 and 2 by pipes 12' and 10' which are provided with check valves 12 and 13. The compartments 1 and 2 have also means in the form of the pipes $9^a$ and $10^a$ for inlet of air from the atmosphere, and which pipes are provided with hand valves 7 and 8. Check valves 9 and 10 are also placed on the pipes $9^a$ and $10^a$. A pipe 29, connected to the pipe $9^a$ is provided for use in case both the chambers 14 and 15 are to be used for gas storage. Pipes 25 and 26, having hand valves 25' and 26' are for the purpose of permitting the air to be drawn off in delivery. Connected to the air compression chamber 1 is a siphon 6.

In the operation of the apparatus, and assuming that the valve 8 is closed, the tank A filled with water to the level indicated at 16, and with the siphon 6 primed with water in its lower leg B, and the water flowing from the tank A through the pipe 3 into the compression chamber 1: it is apparent that the water level will be maintained at the same height in the compartment 2 as in the compartment 1 as the water can pass under the partition through the space 5. As the water rises in the compartments 1 and 2, the air is displaced in the compartment 1, thus closing the check valve 10 (valve 7 being open) and opening the check valve 13—the valve 11 being closed. The air thus compressed into the compartment 1 passes into the chamber 14. Now the water in this chamber 14 normally stood at the same level as the water in tank A, as is indicated at 16$^a$, but on entrance of the air from the compartment 1 a portion of this water is displaced, it being forced back into the tank A. This air pressure is maintained by the closed position of the check valve 13 and the weight of the water applied through the pipe 17 from the water level at 16 in tank A.

In like manner the air contained in the compartment 2 passes through the check valve 12 and into the chamber 15 and the introduction of this compressed air depresses the water level which normally was at 16$^a$ and this compression is also maintained by means of the closing of the check valve 12 and the weight of the water from its level at 16 of tank A, passing through the pipe 17. When the compartments 1 and 2 are filled with water, the weight of the water in pipe 3, which has reached the level shown in this pipe, caused by the back-flow of the water passing from the chambers 14 and 15, there will be an overbalancing of the water in the lower leg of the siphon 6, and the water will be drawn off rapidly through the siphon. As the water is thus lowered in the compartment 1, the gate valve 7 being open, the check valve 10 will open, because the air pressure has in the meantime been drawn off through the pipe 26, thus relieving the pressure on the check valve 10. Check valve 13 will then close. Pipe 10$^a$ then acts as a vent permitting a fresh charge of air to enter the compartment 1, as the water is drawn off by the siphon. During this operation, air compressed in the compartment 2 will pass through the check valve 12 into the chamber 15 and be drawn off through the exit pipe 25, the water in chamber 15 being partly forced back into tank A as in the operation of the chamber 14.

Where the operation of the two chambers 14 and 15 are both utilized for compressing air the procedure is the same for each chamber 14 and 15 and they operate in tandem as will be obvious from the preceding explanation. When so used the valve 27 on pipe 24 is closed.

The apparatus, however, is capable of operation with one of the chambers, say chamber 14 for air compression and chamber 15 for the collection of gas. In such instance the hand valve 8 will be closed, consequently check valve 9 will not be allowed to operate as a vent to draw in air. When so used the compartment 2 will vent through the pipe 24, the check valve 23 on this pipe being allowed to operate, the hand valve 27 being open. Obviously, then, gas from an outside source can be drawn in through the pipe 24, the compartment 2 operating as a vacuum pump, and the gas discharged into the gas receiving chamber 15 and drawn off through the pipe 25 instead of compressed air. As the gas is expelled from this compartment 2, the check valve 23 of course will be closed, permitting the compression and expulsion of the gas into the chamber 15. In the operation of both the chambers 14 and 15 for storage of air under compression, the valve 11 is opened and both valves 7 and 8 will also be opened.

In like manner both chambers 14 and 15 can be utilized for the recovery of gas by operating as a vacuum pump, the vacuum being formed in both compartments 1 and 2. In this case both valves 7 and 8 will then be closed and the valves 27 and 29' opened. The vacuum or suction of the gas will then be through the pipe 24 into compartment 2 and will operate through hand valve 29' (which is opened) into the compartment 1.

The compartments 1 and 2 and the chambers 14 and 15 are so constructed that when operating as an air compressor, each cycle in its operation will convert the same number of cubic feet of free air into compressed air, as the number of cubic feet of water required to complete one cycle of operation, and similarly when operating as a vacuum pump, the number of cubic feet of water required to create one cycle of the pump will create a vacuum, equivalent to the removal of approximately that amount of gas.

The air or gas chambers and compartments being free of moving parts, may be placed below the surface of the ground and hence are not subject to freezing as are the floating type of gasometers. The amount of compression obtainable will be governed by the distance from the water level in pipe 3 to the water level in compartment 1 at the moment the siphon starts flowing; while the amount of vacuum pull will be determined by the distance the water level falls in compartment 2 during one cycle of operation.

The invention is not necessarily restricted to the precise construction here shown, but is capable of modifications and changes such as will be within the scope and meaning of the appended claims.

What is claimed as new is:

1. An apparatus of the character described, comprising a water supply tank, a plurality of air receiving chambers, an air compression chamber divided into two compartments; and a siphon; means for establishing open communication between said air receiving chambers and said air compression chamber; a pipe connecting said tank with said air compression chamber; each of said chambers being closed; air inlets for said air compression chamber and air outlets for said air receiving chambers; the arrangement being such that air in said air compression chamber will be compressed and forced into said air receiving chambers as the water from said tank flows into and fills said compression chambers; said compression chamber being emptied of water by the siphon and simultaneously drawing in air to again fill the air compression chamber to complete the cycle.

2. An apparatus of the character described and as claimed in claim 1, said compression chamber including both compartments each having a pipe with a check valve connecting the compartments to said air receiving chambers, and a piped connection between each of said air receiving chambers and said tank; said check valves permitting the air under pressure to pass into said air receiving chambers and depressing the water in said chambers to force some of the water back into the tank, the water in said air receiving chambers and said check valves maintaining said air pressure.

3. An apparatus of the character described and as claimed in claim 1, said air compression chamber being on a plane below the tank, said pipe connecting said compression chamber to the tank being on a plane with the normal level of the water in said tank, whereby when the water in said tank fills said compression chamber, the air receiving chambers will maintain the level in the tank by forcing part of the water in said chambers back into said tank.

4. An apparatus of the character described, comprising a water supply tank and an air-compression tank, including a plurality of air-receiving chambers for collecting air under pressure; open communication between said compression chamber and said receiving chambers; open communication between each of said air collecting chambers and said tank, whereby each of said air collecting chambers normally contains a supply of water from the tank; a siphon connected to said air compression chamber, whereby when said chamber is filled with water and the air expelled under pressure into said air receiving chambers, part of the water in said latter chambers will be forced back into the tank to maintain said level in the tank; said siphon carrying off the water in said compression tank at each cycle of the operation.

5. An apparatus of the character described and as claimed in claim 1, said air compression chamber being divided into two compartments with a passage in which the water may flow from one compartment to the other; a pipe having connection to said compression chamber and including valves; pipes for each compartment with valve means for introduction of air and for closing the pipes to cut off the air; said first-mentioned pipe for the purpose of forming a vacuum in said compartments as the water is expelled through the siphon, the vacuum drawing in gas, said gas being forced into said chambers instead of air, said chambers storing the gas under pressure.

6. An apparatus of the character described and as claimed in claim 1, said air compression chamber including the compartments being supplied with an additional pipe for inlet of gas when a vacuum is created, said air inlets for the compression chamber including valve means, said valve means being closed and the additional pipe opened to admit gas, said gas being forced into said air receiving chambers by the vacuum created by the emptying of the compression chamber of water.

In testimony whereof I affix my signature.
MATTHEW GRIFFIN O'NEIL.